Sept. 18, 1956  G. P. GIBSON  2,763,825
ALTERNATING-CURRENT MOTOR
Filed May 25, 1953  2 Sheets-Sheet 1

Fig. I.

WITNESSES:
John E. Heasly
Leon J. Taza

INVENTOR
Gordon P. Gibson
BY F. P. Lyle
ATTORNEY

Sept. 18, 1956  G. P. GIBSON  2,763,825
ALTERNATING-CURRENT MOTOR
Filed May 25, 1953  2 Sheets-Sheet 2

WITNESSES:
John E. Hensley
Leon J. Vaja

INVENTOR
Gordon P. Gibson
BY F. P. Lyle
ATTORNEY

United States Patent Office 2,763,825
Patented Sept. 18, 1956

2,763,825
ALTERNATING-CURRENT MOTOR

Gordon P. Gibson, Buffalo, N. Y., assignor to Westinghouse Electric Corporation, East Pittsburgh, Pa., a corporation of Pennsylvania Application May 25, 1953, Serial No. 357,040

2 Claims. (Cl. 318—226)

The present invention relates to alternating-current electric motors and, more particularly, to a three-phase motor having a winding connected and arranged so that a plurality of values of torque can be obtained.

There are certain applications of electric motors in which it is desirable to be able to obtain several different values of torque from a given motor. One example of such an application is the case of motors used for driving certain types of textile mill equipment, such as roving frames. Equipment of this type usually requires a relatively low accelerating torque to prevent breakage of the thread while the machine is accelerating to its operating speed. These machines usually have a large number of spindles, and the torque required varies over a considerable range, depending on the age and condition of the machine, and to some extent on the season of the year. For this reason, it is desirable to be able to obtain different values of torque from the driving motor, so that the maximum permissible accelerating torque of a particular machine will not be exceeded, thus avoiding the danger of breakage of the thread.

The principal object of the present invention is to provide a three-phase, alternating-current motor having a winding which can readily be connected to obtain a plurality of different values of torque.

Another object of the invention is to provide a three-phase motor winding which is arranged to be easily reconnected to change the voltage per turn applied to the winding, so as to obtain different values of torque.

Figure 1:
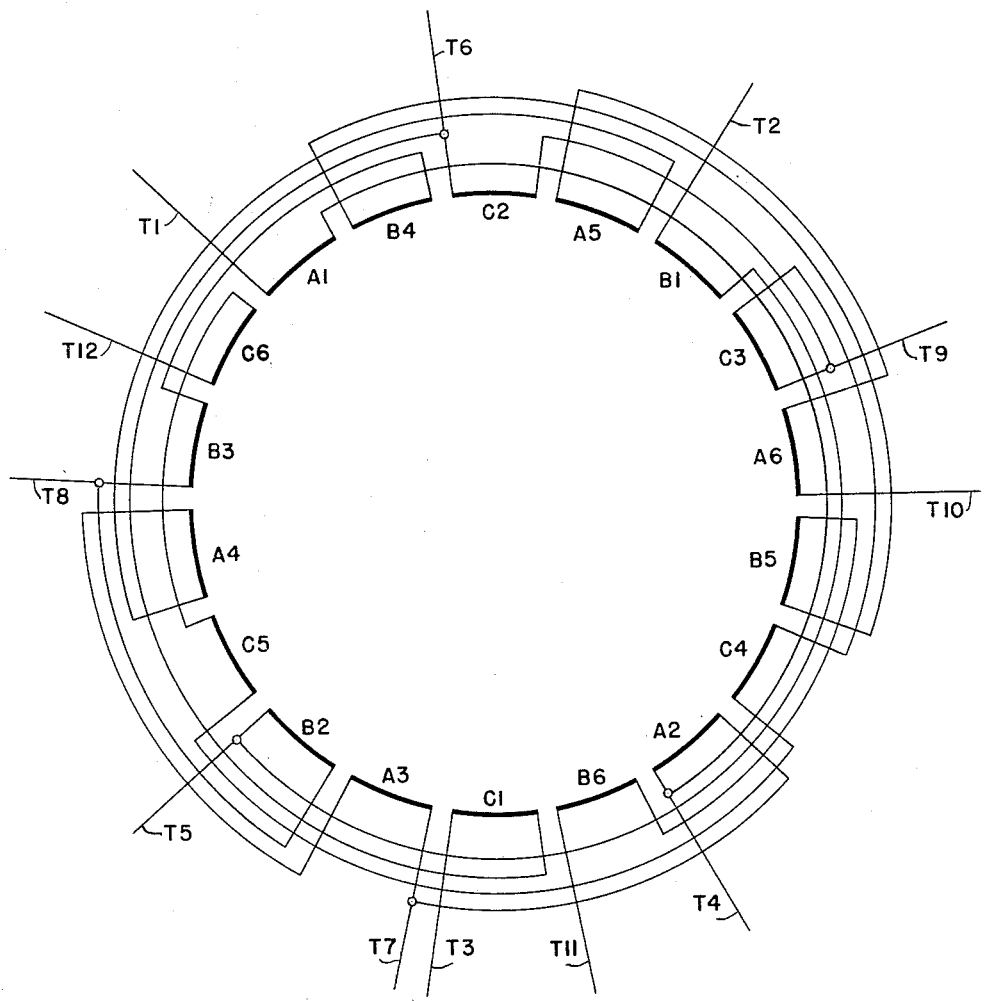
Figure 2:
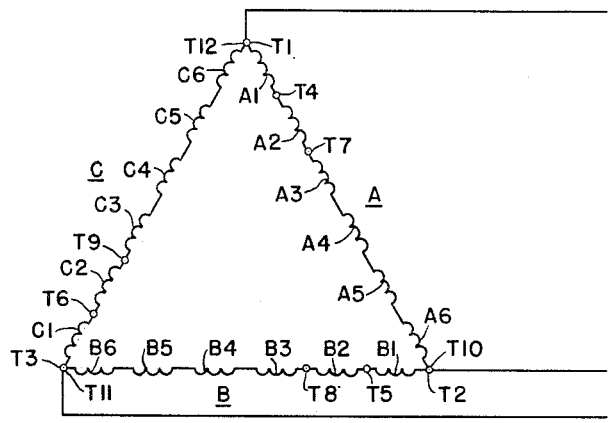
Figure 3:
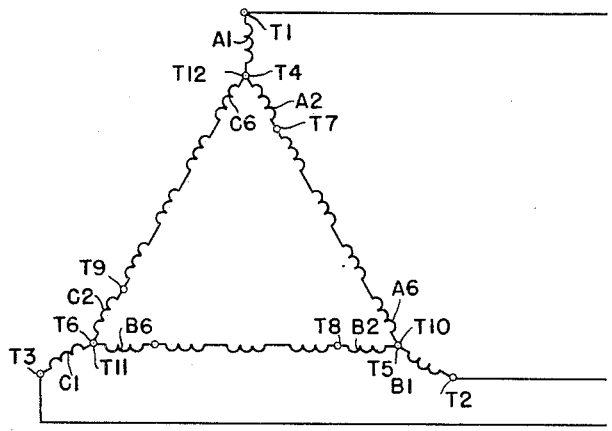
Figure 4:
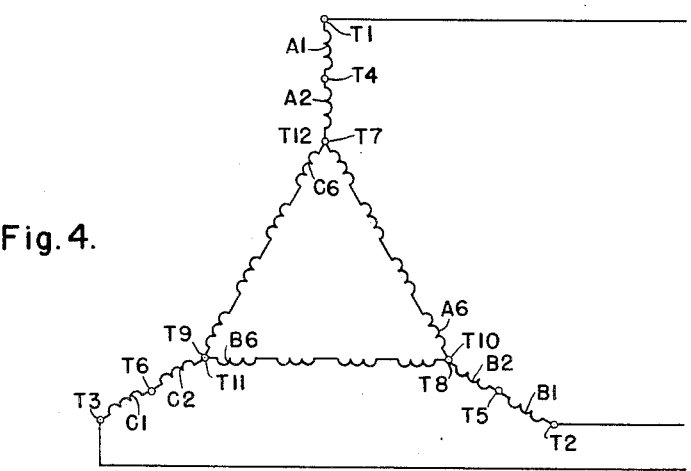

Other objects and advantages of the invention will be apparent from the following detailed description, taken in connection with the accompanying drawings, in which:

Figure 1 is a connection diagram showing an illustrative embodiment of the invention; and Figs. 2, 3 and 4 are schematic diagrams showing the winding connected for three different values of torque.

The invention is shown in the drawings embodied in a three-phase winding which may be utilized in any type of alternating-current motor, either induction or synchronous, and of any suitable or usual physical construction. The particular winding shown is a six-pole winding but it will be evident that the invention is applicable to windings of any number of poles.

The winding consists of a plurality of coils, which may be multiturn coils having any desired number of turns and any desired coil pitch. The particular winding shown for the purpose of illustration is a three-phase, six-pole winding, consisting of eighteen coil groups, each group having three coils, for example, or any suitable number of coils, disposed in the slots of a stator core in the usual manner. The coil groups are connected together in three phases, designated A, B and C on the drawing, each phase having six coil groups to provide six poles. The coil groups of each phase are shown as being connected together in series. Thus, phase A of the winding consists of six coil groups designated A1 to A6, inclusive, connected in series between terminal leads T1 and T10. Similarly, phase B consists of six coil groups B1 to B6, inclusive, connected in series between terminal leads T2 and T11, and phase C consists of coil groups C1 to C6, inclusive, connected in series between terminal leads T3 and T12. The coil groups of each phase may be arranged in any desired manner on the stator core to obtain the desired phase sequence, one particular arrangement being shown in Fig. 1 for the purpose of illustration.

Each phase of the winding is provided with two tap connections adjacent one end of the phase. Thus, phase A has a tap connection T4 between the coil groups A1 and A2, and a tap connection T7 between the coil groups A2 and A3. Similarly, phase B has a tap connection T5 between groups B1 and B2, and a tap connection T8 between groups B2 and B3. Phase C has a tap connection T6 between groups C1 and C2, and a tap connection T9 between groups C2 and C3.

The winding is intended for delta connection as shown in Fig. 2, with terminal leads T1 and T12 connected together, terminal leads T2 and T10 connected together, and terminal leads T3 and T11 connected together. This provides a conventional delta-connected winding, and gives the maximum torque obtainable from the winding. To obtain a lower torque, the connections are changed in the manner shown in Fig. 3, in which the terminal lead T10 of phase A is connected to the tap connection T5, terminal lead T11 of phase B is connected to the tap connection T6, and terminal lead T12 of phase C is connected to the tap connection T4. It will be evident from Fig. 3 that this places one coil group of each phase in series between one corner of the delta and the line, resulting in what may be termed a series-star-delta connection. The effect of this connection is to increase the number of coils in series across each phase of the line, and thus the voltage per turn applied to each coil of the winding is correspondingly decreased. Since the voltage per turn determines the field strength or flux density in the motor, and the torque is a function of the flux density, the effect is to reduce the torque obtainable.

If a still lower torque is desired, the winding may be reconnected as shown in Fig. 4, with the terminal lead T10 connected to tap connection T8, terminal lead T11 connected to tap connection T9, and terminal lead T12 connected to tap connection T7. It will be seen that this places two coil groups in series between each corner of the delta and the line, and thus further increases the number of coils across each phase of the line, so that the voltage per turn is further reduced and a lower torque is obtained.

It will be apparent that reduced values of torque are readily obtainable in this manner merely by changing the connections in the manner described. For example, in the embodiment shown, if the torque obtainable with the connection of Fig. 1 is taken as 100%, the connection of Fig. 3 provides a torque of approximately 84% and the connection of Fig. 4 provides a torque of approximately 69%. If other values of torque are desired, they can readily be obtained by providing additional tap connections to permit the number of turns effectively in series across each phase of the line to be further varied. Any number of values of torque may be obtained in this way by providing the proper tap connections, which may also be brought out between coils of a group, or even between turns of the coils, to obtain smaller steps, if desired or necessary.

It should now be apparent that a three-phase motor winding has been provided which can be connected to provide any one of a number of different values of torque. This result is obtained in a simple and convenient manner simply by providing the necessary tap connections, which can be brought out to a terminal board so that the connections can be changed easily and conveniently. A particular embodiment of the invention has been shown and described for the purpose of illustration, but it will be apparent that various modifications and other embodiments are possible within the scope of the invention. It is to be understood, therefore, that the invention is not limited to the specific embodiment shown but includes all equivalent embodiments and modifications.

I claim as my invention:

1. An alternating-current motor having a three-phase winding, each phase of said winding comprising a plurality of coils permanently connected together in a plurality of pole groups, and means for connecting said phases in delta to a three-phase supply line, each of said phases having a plurality of tap connections at a plurality of separated points adjacent one end thereof to permit connecting predetermined portions of each phase between the corners of the delta and the line to obtain a plurality of definite, predetermined values of output torque.

2. An alternating-current motor having a three-phase winding, each phase of said winding comprising a plurality of coils permanently connected together in a plurality of pale groups, each phase having a plurality of tap connections at a plurality of separated points adjacent one end thereof, and means for connecting the other end of each phase alternatively to said one end of an adjacent phase or to one of said tap connections of the adjacent phase to obtain a plurality of definite, predetermined values of output torque.

References Cited in the file of this patent

UNITED STATES PATENTS

| | | |
|---|---|---|
| 1,711,979 | Weinert | May 7, 1929 |

FOREIGN PATENTS

| | | |
|---|---|---|
| 618,322 | France | Dec. 13, 1926 |